United States Patent
Ji et al.

(10) Patent No.: US 12,262,340 B2
(45) Date of Patent: Mar. 25, 2025

(54) TECHNIQUES FOR TIMING ADJUSTMENT

(71) Applicant: QUALCOMM Incorporated, San Diego, CA (US)

(72) Inventors: Lianghai Ji, San Diego, CA (US); Changhwan Park, San Diego, CA (US); Mehmet Izzet Gurelli, San Diego, CA (US); Liangping Ma, San Diego, CA (US); Venkatraman Rajagopalan, San Diego, CA (US); Mohamad Sayed Hassan, Paris (FR); Qiang Wu, San Diego, CA (US); Jun Ma, San Diego, CA (US); Huilin Xu, Temecula, CA (US); Weimin Duan, San Diego, CA (US); Karthik Anantha Swamy, La Jolla, CA (US); Alexander Dorosenco, El Cajon, CA (US); Onur Senel, San Diego, CA (US); Nitzan Ofer, San Diego, CA (US); Yan Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 17/892,825

(22) Filed: Aug. 22, 2022

(65) Prior Publication Data
US 2024/0064679 A1   Feb. 22, 2024

(51) Int. Cl.
*H04W 56/00* (2009.01)

(52) U.S. Cl.
CPC ....... *H04W 56/005* (2013.01); *H04W 56/006* (2013.01)

(58) Field of Classification Search
CPC ............. H04W 56/005; H04W 56/006; H04W 56/0015; H04W 84/06; H04W 56/0005;
(Continued)

(56) References Cited

U.S. PATENT DOCUMENTS

2016/0242044 A1* 8/2016 Han ................... H04B 17/27
2020/0249311 A1* 8/2020 Wirola ................ G01S 5/0036
(Continued)

FOREIGN PATENT DOCUMENTS

CN         114731486 A     7/2022

OTHER PUBLICATIONS

3GPP TR 38.821 V1.1.0, "3rd Generation Partnership Project, Technical Specification Group Radio Access Network, Solutions for NR to Support Non-Terrestrial Networks (NTN), Release 16", RP-193062, 3rd Generation Partnership Project, Mobile Competence Centre, 650, Route Des Lucioles, F-06921, Sophia-Antipolis Cedex, France, Dec. 10, 2019, pp. 1-143, XP051838792, pp. 14-68.
(Continued)

*Primary Examiner* — Ashley Shivers
(74) *Attorney, Agent, or Firm* — Holland & Hart LLP/QUALCOMM Incorporated

(57) ABSTRACT

Methods, systems, and devices for wireless communication are described. A user equipment (UE) may obtain updated location information, and determine a time difference between a previous communication with a network and a scheduled uplink transmission. Based on the determined
(Continued)

time difference, the UE may determine a timing advance (TA) component of a TA value to apply for the uplink transmission, and transmit an uplink message in the uplink transmission according to the determined TA value and the location information. In some examples, the time difference may be based on a first duration between the uplink transmission and a previous uplink transmission, a second duration between the uplink transmission and a previous TA command received from the network, or both. In some examples, the determined TA value may be based on additional parameters, such as an autonomous adjustment step, an aggregate adjustment rate, a scaling factor, or any combination thereof.

27 Claims, 15 Drawing Sheets

(58) Field of Classification Search
CPC ............. H04W 56/0045; H04B 7/1851; H04B 7/1853
See application file for complete search history.

(56) References Cited

U.S. PATENT DOCUMENTS

| | | | |
|---|---|---|---|
| 2022/0070811 A1* | 3/2022 | Tripathi | H04W 56/006 |
| 2022/0124795 A1* | 4/2022 | Wu | H04W 74/0833 |
| 2022/0263570 A1 | 8/2022 | Wang et al. | |
| 2023/0388952 A1* | 11/2023 | Khoshkholgh Dashtaki | H04B 7/18513 |
| 2024/0057002 A1* | 2/2024 | Sun | H04W 72/232 |
| 2024/0179654 A1* | 5/2024 | Wong | H04W 56/006 |

OTHER PUBLICATIONS

International Search Report and Written Opinion—PCT/US2023/072110—ISA/EPO—Dec. 22, 2023.
3rd Generation Partnership Project; Technical Specification Group Radio Access Network; NR; Physical channels and modulation (Release 17) (3GPP TS 38.211 V17.2.0 (Jun. 2022).
3rd Generation Partnership Project; Technical Specification Group Radio Access Network; NR; Physical channels and modulation (Release 17) (3GPP TS 38.133 V17.6.0 (Jun. 2022).

* cited by examiner

TECHNIQUES FOR TIMING ADJUSTMENT

INTRODUCTION

The following relates to wireless communication, including timing techniques.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

A method for wireless communication at a UE is described. The method may include transmitting a first message according to a first value for a timing advance (TA) component, the first value based on first location information associated with the UE, obtaining second location information associated with the UE, the second location information different from the first location information, and transmitting a second message according to a second value for the TA component, the second value different from the first value, the second value based on the second location information and a time difference associated with at least one previous communication at the UE.

An apparatus for wireless communication at a UE is described. The apparatus may include a processor, and memory coupled with the processor. The processor may be configured to transmit a first message according to a first value for a TA component, the first value based on first location information associated with the UE, obtain second location information associated with the UE, the second location information different from the first location information, and transmit a second message according to a second value for the TA component, the second value different from the first value, the second value based on the second location information and a time difference associated with at least one previous communication at the UE.

Another apparatus for wireless communication at a UE is described. The apparatus may include means for transmitting a first message according to a first value for a TA component, the first value based on first location information associated with the UE, means for obtaining second location information associated with the UE, the second location information different from the first location information, and means for transmitting a second message according to a second value for the TA component, the second value different from the first value, the second value based on the second location information and a time difference associated with at least one previous communication at the UE.

A non-transitory computer-readable medium storing code for wireless communication at a UE is described. The code may include instructions executable by a processor to transmit a first message according to a first value for a TA component, the first value based on first location information associated with the UE, obtain second location information associated with the UE, the second location information different from the first location information, and transmit a second message according to a second value for the TA component, the second value different from the first value, the second value based on the second location information and a time difference associated with at least one previous communication at the UE.

In some examples of the method, apparatuses, and non-transitory computer-readable medium described herein, transmitting the second message may include operations, features, means, or instructions for transmitting the second message based on the time difference, where the time difference may be based on a first duration between a first previous communication of the at least one previous communication and a transmission timing of the second message, a second duration between a second previous communication of the at least one previous communication and the transmission timing of the second message, or both.

In some examples of the method, apparatuses, and non-transitory computer-readable medium described herein, the time difference may be a lower duration of the first duration and the second duration.

In some examples of the method, apparatuses, and non-transitory computer-readable medium described herein, the first previous communication includes the first message and the second previous communication includes a previous TA command and the method, apparatuses, and non-transitory computer-readable medium may include further operations, features, means, or instructions for receiving the previous TA command from a network entity.

In some examples of the method, apparatuses, and non-transitory computer-readable medium described herein, transmitting the second message may include operations, features, means, or instructions for transmitting the second message according to the second value, where the second value may be based on an autonomous adjustment step, an aggregate adjustment rate, a scaling factor, or any combination thereof.

Some examples of the method, apparatuses, and non-transitory computer-readable medium described herein may further include operations, features, means, or instructions for receiving, from a network entity, a timing scheme that indicates one or more conditions for the UE to use the second value, where the second message may be transmitted according to the second value based on the timing scheme and satisfaction of at least one of the one or more conditions.

Some examples of the method, apparatuses, and non-transitory computer-readable medium described herein may further include operations, features, means, or instructions for determining that the time difference satisfies a threshold, where the satisfaction of the at least one of the one or more conditions includes the time difference satisfying the threshold.

Some examples of the method, apparatuses, and non-transitory computer-readable medium described herein may further include operations, features, means, or instructions for determining, based on the second location information, that a location change of the UE satisfies one or more thresholds, the location change based on the first location information and the second location information, where the satisfaction of the at least one of the one or more conditions includes the location change of the UE satisfying the one or more thresholds.

Some examples of the method, apparatuses, and non-transitory computer-readable medium described herein may further include operations, features, means, or instructions for determining, based on the second location information, that a change associated with the TA component satisfies one or more thresholds, where the satisfaction of the at least one of the one or more conditions includes the change associated with the TA component satisfying the one or more thresholds.

Some examples of the method, apparatuses, and non-transitory computer-readable medium described herein may further include operations, features, means, or instructions for receiving, from the network entity, an indication that the UE may be to determine the second value, where the satisfaction of the at least one of the one or more conditions includes the UE receiving the indication.

In some examples of the method, apparatuses, and non-transitory computer-readable medium described herein, transmitting the second message may include operations, features, means, or instructions for transmitting the second message via a random access channel based on the time difference satisfying a threshold.

In some examples of the method, apparatuses, and non-transitory computer-readable medium described herein, transmitting the second message may include operations, features, means, or instructions for transmitting the second message to a network entity that supports non-terrestrial network (NTN) communications for the UE.

A method for wireless communications at a network entity is described. The method may include obtaining a first message according to a first value for a TA component, the first value based on first location information associated with a UE, outputting a timing scheme that indicates one or more conditions for the UE to use a second value for the TA component, the second value different from the first value, and obtaining a second message according to the second value for the TA component, the second value different from the first value, the second value based on the timing scheme and satisfaction of at least one of the one or more conditions.

An apparatus for wireless communications at a network entity is described. The apparatus may include a processor, and memory coupled with the processor. The processor may be configured to obtain a first message according to a first value for a TA component, the first value based on first location information associated with a UE, output a timing scheme that indicates one or more conditions for the UE to use a second value for the TA component, the second value different from the first value, and obtain a second message according to the second value for the TA component, the second value different from the first value, the second value based on the timing scheme and satisfaction of at least one of the one or more conditions.

Another apparatus for wireless communications at a network entity is described. The apparatus may include means for obtaining a first message according to a first value for a TA component, the first value based on first location information associated with a UE, means for outputting a timing scheme that indicates one or more conditions for the UE to use a second value for the TA component, the second value different from the first value, and means for obtaining a second message according to the second value for the TA component, the second value different from the first value, the second value based on the timing scheme and satisfaction of at least one of the one or more conditions.

A non-transitory computer-readable medium storing code for wireless communications at a network entity is described. The code may include instructions executable by a processor to obtain a first message according to a first value for a TA component, the first value based on first location information associated with a UE, output a timing scheme that indicates one or more conditions for the UE to use a second value for the TA component, the second value different from the first value, and obtain a second message according to the second value for the TA component, the second value different from the first value, the second value based on the timing scheme and satisfaction of at least one of the one or more conditions.

Some examples of the method, apparatuses, and non-transitory computer-readable medium described herein may further include operations, features, means, or instructions for outputting an indication that the UE may be to determine the second value, where the satisfaction of the at least one of the one or more conditions includes outputting the indication.

In some examples of the method, apparatuses, and non-transitory computer-readable medium described herein, obtaining the second message may include operations, features, means, or instructions for obtaining the second message via a random access channel.

In some examples of the method, apparatuses, and non-transitory computer-readable medium described herein, the network entity supports NTN communications for the UE.

DETAILED DESCRIPTION

In an NTN, a UE may be configured to use a TA value to compensate for adjustments in communication delays based on changes in the UE's position. The UE may receive a TA command from a network entity, and determine a TA value to apply for uplink transmissions. The TA value may be based on one or more TA components, including a TA component which the UE may determine based on its own location information and/or satellite position. However, in some cases, a UE may obtain updated location information without an updated TA command. In this case, if UE does not update its TA value based on the updated location information, it may impact reliability of uplink transmissions until the UE receives a new TA command.

As described herein, a UE may use location information and/or satellite position to determine a TA component for transmitting an uplink message, for example, without receiving a TA command. For example, the UE may obtain updated location information, and determine a time difference between a previous communication with a network and a scheduled uplink transmission. Based on the determined time difference, the UE may determine a TA component of a TA value to apply for the uplink transmission, and transmit an uplink message in the uplink transmission according to the determined TA value and the location information. In some examples, the time difference may be based on a first duration between the uplink transmission and a previous uplink transmission, a second duration between the uplink transmission and a previous TA command received from the network, or both. For example, the time difference may be the least of the first and second durations. In some examples, the determined TA value may be based on additional parameters, such as an autonomous adjustment step ($T_q$), an aggregate adjustment rate ($T_p$), a scaling factor ($\alpha$), or any combination thereof.

By implementing one or more of the described techniques for timing adjustment, devices of a wireless communications system may be able to effectively implement transmission schemes based on updated location in a timely manner that increases data throughput and improves latency, which may correspond to improved power consumption and communications reliability, among other considerations. For example, based on obtaining the updated location information, a UE may transmit data more reliably, which may increase data throughput and improve latency by reducing dropped or failed transmissions.

One or more aspects of the disclosure are initially described in the context of wireless communications systems. One or more aspects of the disclosure are further illustrated by and described with reference to a process flow, apparatus diagrams, system diagrams, and flowcharts that relate to techniques for timing adjustment.

Figure 1:
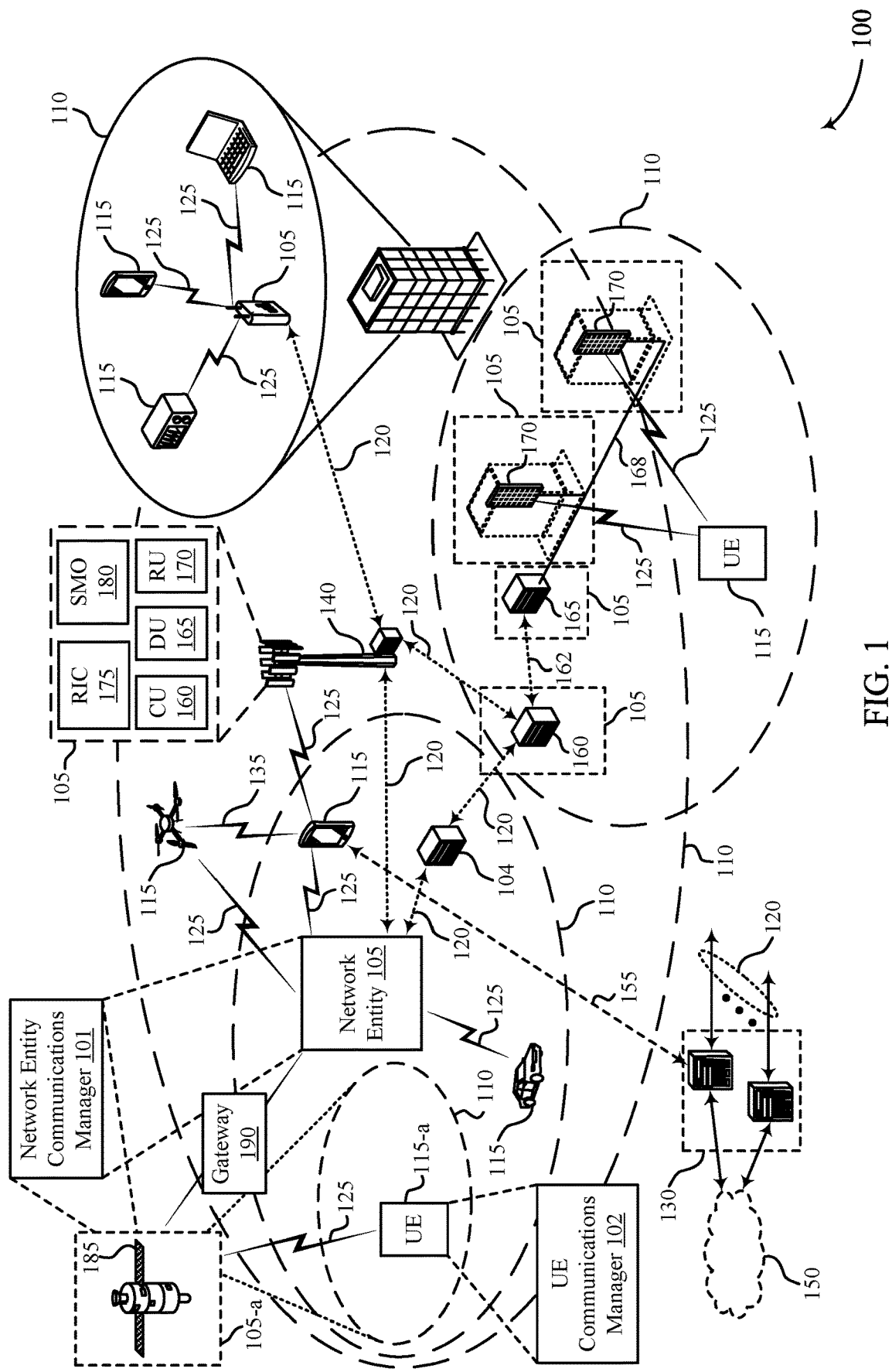
FIG. 1 illustrates an example of a wireless communications system that supports techniques for timing adjustment in accordance with one or more aspects of the present disclosure.

FIG. 1 illustrates an example of a wireless communications system 100 that supports techniques for timing adjustment in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node. Consistent with this disclosure, once a specific example is broadened in accordance with this disclosure (e.g., a UE 115 is configured to receive information from a network entity 105 also discloses that a first network node is configured to receive information from a second network node), the broader example of the narrower example may be interpreted in the reverse, but in a broad open-ended way. In the example above where a UE 115 being configured to receive information from a base station also discloses that a first network node being configured to receive information from a second network node, the first network node may refer to a first UE 115, a first network entity 105, a first apparatus, a first device, a first computing system, a first one or more components, a first processing entity, or the like configured to receive the information; and the second network node may refer to a second UE 115, a second network entity 105, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support PEIs in NTNs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_c=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). The region from 300 MHz to 3 GHz may be known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity communications manager 101 may manage communications between a network entity 105 and other devices in the wireless communications system 100. In a similar manner, a UE communications manager 102 may manage communications between a UE 115 and other devices in the wireless communications system 100. As described herein, a network entity 105 may refer to a terrestrial communication device (such as a base station 140) or a non-terrestrial communication device (such as a satellite 185, a balloon, a drone, or another non-terrestrial device).

An NTN network entity 105 may be connected to a terrestrial network entity 105 via a gateway 190. In some examples, a NTN network entity 105 may correspond to a first cell type (e.g., an NTN cell type), and a terrestrial network entity 105 may correspond to a second cell type (e.g., a terrestrial network (TN) cell type) different from the first cell type.

A NTN network entity 105 may provide coverage to areas in which a terrestrial network entity 105 may not be available. A channel corresponding to the NTN network entity 105 may have strong line of sight conditions, as a signal provided by the NTN network entity 105 may be reflected at the sky (e.g., as opposed to a signal corresponding to a terrestrial network entity 105 which may travel over a ground surface). A footprint of a beam radiated from the NTN network entity 105 may have a relatively clear boundary (e.g., as compared to terrestrial network entity 105 beam boundaries), and a UE 115 may be likely to operate within a single beam serving area (e.g., except in cases where a UE 115 is located at the boundary between two serving areas). In some examples, a serving area for a beam corresponding to the NTN network entity 105 may be larger than a serving area for a beam corresponding to a terrestrial network entity 105.

In accordance with one or more aspects of the present disclosure, the wireless communications system 100 may support a UE 115 using location information to determine a TA component for transmitting an uplink message, for example, without receiving a TA command (e.g., from a network entity 105). For example, the UE 115 may obtain updated location information, and determine a time difference between a previous communication with a network entity 105 and a scheduled uplink transmission. Based on the determined time difference, the UE 115 may determine a TA component of a TA value to apply for the uplink transmission, and transmit an uplink message in the uplink transmission according to the determined TA value and the location information. In some examples, the time difference may be based on a first duration between the uplink transmission and a previous uplink transmission, a second duration between the uplink transmission and a previous TA command received from the network, or both. For example, the time difference may be the least of the first and second durations. In some examples, the determined TA value may be based on additional parameters, such as $T_q$, $T_p$, $\alpha$, or any combination thereof.

In some examples, a network entity 105-a may include a network entity communications manager 101 that is configured to support one or more aspects of the techniques for timing adjustment described herein. For example, the network entity communications manager 101 may be configured to support the network entity 105-a obtaining (e.g., from a UE 115-a) a first message according to a first value for a timing advance component, the first value based on first location information associated with the UE 115-a. In some examples, the network entity communications manager 101 may be configured to support the network entity 105-a outputting (e.g., for transmission to the UE 115-a) a timing scheme that indicates one or more conditions for the UE 115-a to use a second value for the timing advance component, the second value different from the first value. In some examples, the network entity communications manager 101 may be configured to support the network entity 105-a obtaining (e.g., from the UE 115-a) a second message according to the second value for the timing advance component, the second value based on the timing scheme and satisfaction of at least one of the one or more conditions.

In some examples, the UE 115-a may include a UE communications manager 102 that is configured to support one or more aspects of the techniques for timing adjustment described herein. For example, the UE communications manager 102 may be configured to support the UE 115-a transmitting (e.g., to the network entity 105-a) a first message according to a first value for a timing advance component, the first value based on first location information associated with the UE 115-a. In some examples, the UE communications manager 102 may be configured to support the UE 115-a obtaining second location information associated with the UE 115-a, the second location information different from the first location information. In some examples, the UE communications manager 102 may be configured to support the UE 115-a transmitting a second message according to a second value for the timing advance component, the second value different from the first value, the second value based on the second location information and a time difference associated with at least one previous communication at the UE 115-a.

Figure 2:
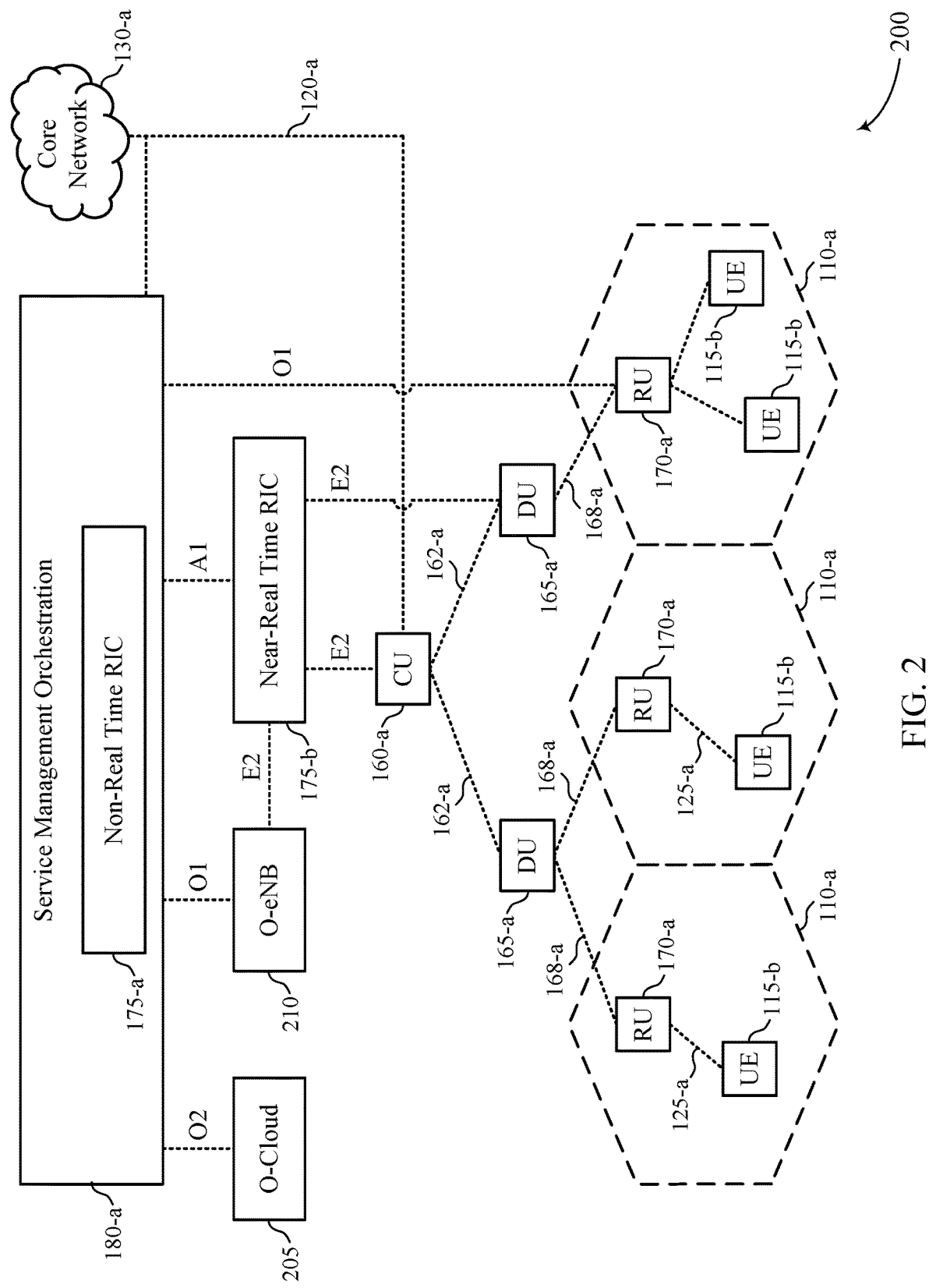
FIG. 2 illustrates an example of a network architecture that supports techniques for timing adjustment in accordance with one or more aspects of the present disclosure.

FIG. 2 illustrates an example of a network architecture 200 (e.g., a disaggregated base station architecture, a disaggregated RAN architecture) that supports techniques for timing adjustment in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-b via one or more communication links 125-a. In some implementations, a UE 115-b may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*b*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

In accordance with one or more aspects of the present disclosure, the network architecture 200 may support a UE 115-*b* using location information to determine a TA component for transmitting an uplink message, for example, without receiving a TA command (e.g., from a network entity 105). For example, the UE 115-*b* may obtain updated location information, and determine a time difference between a previous communication with a network entity 105 and a scheduled uplink transmission. Based on the determined time difference, the UE 115-*b* may determine a TA component of a TA value to apply for the uplink transmission, and transmit an uplink message in the uplink transmission according to the determined TA value and the location information. In some examples, the time difference may be based on a first duration between the uplink transmission and a previous uplink transmission, a second duration between the uplink transmission and a previous TA command received from the network, or both. For example, the time difference may be the least of the first and second durations. In some examples, the determined TA value may be based on additional parameters, such as $T_q$, $T_p$, $\alpha$, or any combination thereof.

Figure 3:
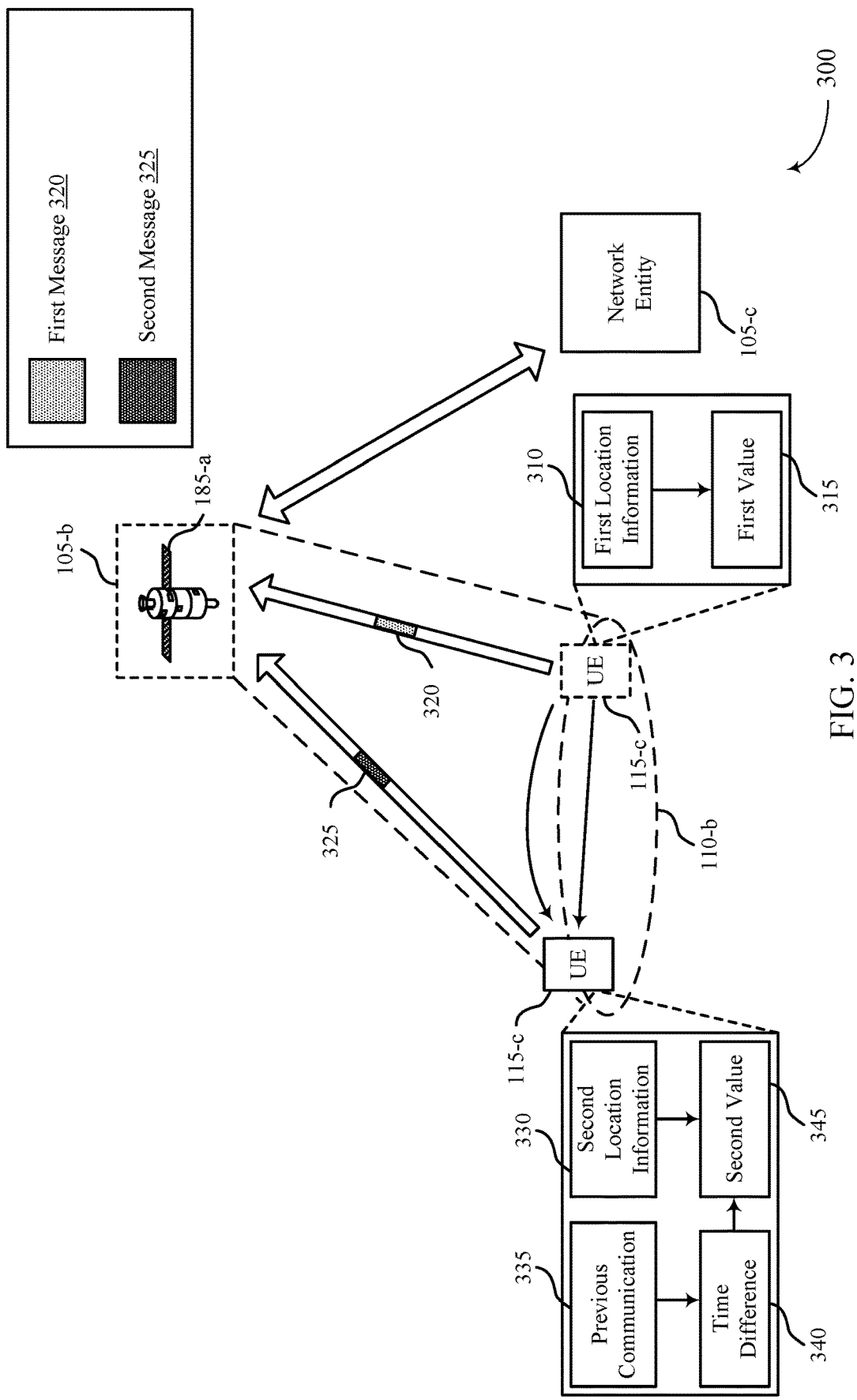
FIG. 3 illustrates an example of a wireless communications system that supports techniques for timing adjustment in accordance with one or more aspects of the present disclosure.

FIG. 3 illustrates an example of a wireless communications system 300 that supports techniques for timing adjustment in accordance with one or more aspects of the present disclosure. In some examples, the wireless communications system 300 may implement one or more aspects of the wireless communications system 100. For example, the wireless communications system 300 may include a UE 115-*c* and one or more network entities 105, which may be examples of corresponding devices described with reference to FIGS. 1 and 2. described with reference to FIG. 1. In some examples, a network entity 105-*b* in the wireless communications system 300 may be or include a satellite 185-*a* of an NTN, which may communicate with a network entity 105-*c* (e.g., of a TN) via a gateway, as described with reference to FIG. 1. The wireless communications system 300 may include features for improved communications between the UE 115-*c* and the network entities 105, among other improvements.

The network entity 105-b may provide communication coverage for the UE 115-c in a coverage area 110-b, for example, in a rural area that is not covered by a network entity 105 of a TN. The UE 115-c may be configured to calculate a delay associated with a service link (e.g., a link between the UE 115-c and the satellite 185-a) based on a location of the UE 115-c and an ephemeris (e.g., a position) of the satellite 185-a. For example, the UE 115-c may obtain location information (e.g., first location information 310 or second location information 330) associated with the UE 115-c, such as from a global navigation satellite system (GNSS) component at the UE 115-c, and the network entity 105-b may indicate the ephemeris of the satellite 185-a to the UE 115-c. In some examples, the UE 115-c may autonomously calculate the delay, to determine a TA value for uplink communications, such that an uplink frame timing and a downlink frame timing may be aligned at a reference point (e.g., the network entity 105-c).

In some cases, the UE 115-c may apply a combination of closed loop and open loop TA adjustments to determine the TA value. For example, the UE 115-c may determine the timing advance value $T_{TA}$ according to the formula:

$$T_{TA} = (N_{TA} + N_{TA,UE\text{-}specific} + N_{TA,common} + N_{TA,offset}) \times T_c. \quad (1)$$

In Equation 1, $N_{TA}$ may represent a TA value that is updated based on a TA command from the network entity 105-b, such as in a TA command field of a msg2 or a msgB, a MAC control element (MAC-CE) TA command, or both. $N_{TA,UE\text{-}specific}$ may represent a self-estimated TA value (e.g., a first value 315 or a second value 345) at the UE 115-c to pre-compensate for the delay (e.g., the service link delay). $N_{TA,common}$ may represent a common TA value (e.g., controlled by the network entity 105-c, the network entity 105-b, or both) to compensate for a feeder link delay between the satellite 185-a and the network entity 105-c. $N_{TA,offset}$ may represent an offset associated with a downlink frame at the UE 115-c.

In some cases, the UE 115-c may be connected to the NTN for a duration [T1, T2] (e.g., a duration between a time T1 and a time T2, inclusive) in which the UE 115-c may not receive a TA command from the network entity 105-b. In one example, the UE 115-c may be in a communication session with more downlink communication and less uplink communication (e.g., control-plane information), and the network entity 105-b may not transmit a TA command in the duration [T1, T2]. For example, the network entity 105-b may provide multicast or broadcast service (or both), which may include more downlink data traffic and sparse uplink control traffic (e.g., feedback messages).

As described herein, the UE 115-c may obtain first location information 310 (e.g., from a GNSS component), and apply a first value 315 for a TA component (e.g., $N_{TA,UE\text{-}specific}$) at the time T1 to transmit a first message 320, where the first value 315 may be based on the first location information 310. Subsequently, the UE 115-c may obtain second location information 330 with or without obtaining a TA command in the duration [T1, T2]. The UE 115-c may additionally determine a time difference 340 associated with a previous communication 335, and apply a second value 345 for the TA component at the time T2 to transmit a second message 325, where the second value 345 may be based on the second location information 330 and the time difference 340.

In some examples, the time difference 340 may be based on a first duration between transmission of the second message 325 and a previous uplink transmission (e.g., the first message 320), where the previous communication 335 may be the previous uplink transmission. Additionally, or alternatively, the time difference 340 may be based on a second duration between transmission of the second message 325 and a previous TA command received from the network entity 105-b, where the previous communication 335 may be the previous TA command. In some examples, the time difference 340 may be the lower duration of the first duration and the second duration.

In some examples, based on the time difference 340, the UE 115-c may determine a magnitude (e.g., a maximal amount of the magnitude) of a change in the TA component (e.g., $N_{TA,UE\text{-}specific}$) and determine the second value 345 based on the determined magnitude. The magnitude may be based on the time difference 340, an autonomous adjustment step ($T_q$), an aggregate adjustment rate ($T_p$), a scaling factor ($\alpha$), or any combination thereof. For example, the magnitude may be $$T_q \times \frac{T}{200 \text{ ms}},$$

$$T_q \times \left\lfloor \frac{T}{200 \text{ ms}} \right\rfloor,$$

$$T_q \times \frac{T}{200 \text{ ms}} \times \alpha,$$

or $$T_q \times \left\lfloor \frac{T}{200 \text{ ms}} \right\rfloor \times \alpha,$$

where T may represent the time difference 340 and $\lfloor x \rfloor$ may represent a floor function that returns a greatest integer that is less than x. In some examples, the scaling factor $\alpha$ may be configured at the UE 115-c or indicated by the network entity 105-b to the UE 115-c. In some examples, the autonomous adjustment step ($T_q$) and/or the aggregate adjustment rate ($T_p$) may be defined or according to a definition described in a technical specification, e.g., TS 38.133.

In some examples, the UE 115-c may determine that the magnitude of the change is greater than (or equal to) a timing change derived based on the second location information 330, and use the derived timing change to determine the second value 345. In some examples, the UE 115-c may determine that the magnitude of the change is less than the derived timing change, and use the magnitude of the change to determine the second value 345. The UE 115-c may adjust the value of the TA component for a subsequent one or more uplink transmission (e.g., according to a gradual timing adjustment procedure, or as described herein) until the derived change is reached.

In some examples, if the magnitude of the change is less than a threshold (e.g., the derived change minus a fixed amount) compared to the derived timing change, the UE 115-c may transmit the second message 325 over a random access channel (RACH), for example, by applying the magnitude of the change to determine the second value 345. Additionally, or alternatively, the UE 115-c may be configured to apply the techniques described herein based on satisfaction of one or more conditions. In some examples, the conditions may be satisfied if the UE 115-c determines that the time difference 340 is greater than a threshold, which may be configured at the UE 115-c. In some examples, the conditions may be satisfied if the UE 115-c determines that a location change (e.g., based on the first location information 310 and the second location information 330) is above or below an associated threshold. In some examples, the conditions may be satisfied if the UE 115-c determines that the derived timing change is above or below an associated threshold. In some examples, the conditions may be satisfied if the UE 115-c receives an indication (e.g., a configuration) from the network entity 105-b.

Figure 4:
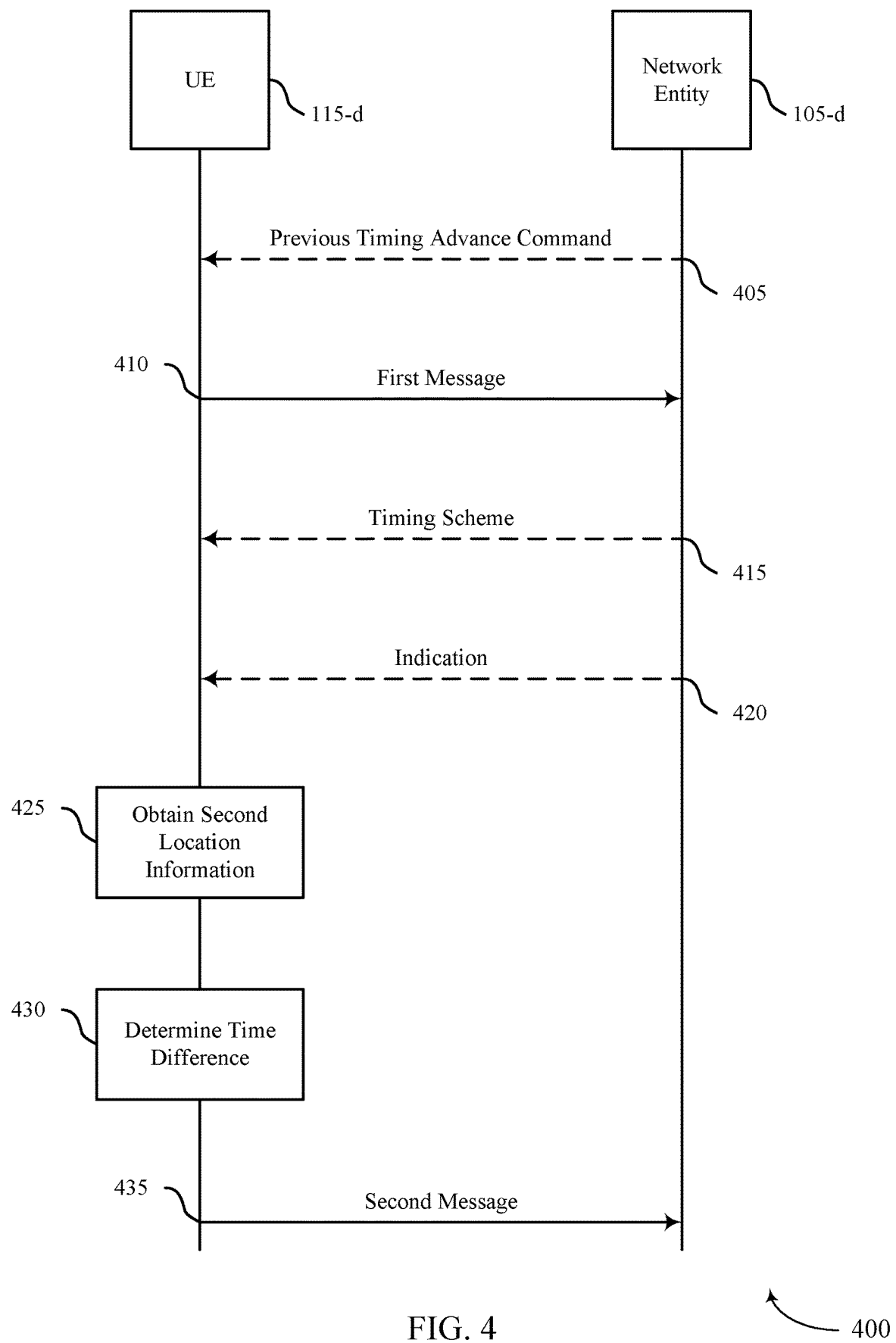
FIG. 4 illustrates an example of a process flow that supports techniques for timing adjustment in accordance with one or more aspects of the present disclosure.

FIG. 4 illustrates an example of a process flow 400 that supports techniques for timing adjustment in accordance with one or more aspects of the present disclosure. In some examples, the process flow 400 may implement one or more aspects of wireless communications systems 100 and 300, or one or more aspects of the network architecture 200. For example, the process flow 400 may include example operations associated with a UE 115-d or a network entity 105-d, which may be examples of corresponding devices described with reference to FIGS. 1-3. In some examples, the network entity 105-d may support NTN communications for the UE 115-d.

In the following description of the process flow 400, the operations between the UE 115-d and the network entity 105-d may be performed in a different order than the example order shown, or the operations performed by the UE 115-d and the network entity 105-d may be performed in different orders or at different times. Some operations may also be omitted from the process flow 400, and other operations may be added to the process flow 400. The operations performed by the UE 115-d and the network entity 105-d may support improvements to communications reliability and, in some examples, may increase communications efficiency.

In some examples, at 405, the UE 115-d may receive (e.g., from the network entity 105-d) a previous TA command from the network entity 105-d. The previous TA command may include timing information for the UE 115-d to use when communicating in an NTN.

At 410, the UE 115-d may transmit a first message according to a first value for a TA component, the first value based on first location information associated with the UE 115-d. In some examples, the UE 115-d may obtain the first location from a GNSS component (e.g., at the UE 115-d).

In some examples, at 415, the UE 115-d may receive (e.g., from the network entity 105-d) a timing scheme that indicates one or more conditions. The timing scheme may further indicate that the UE 115-d is to use a second value for the TA component when transmitting a second message based on satisfaction of at least one of the one or more conditions.

In some examples, at 420, the UE 115-d may receive (e.g., from the network entity 105-d) an indication that the UE is to determine the second value for the TA component, where the indication may satisfy one of the conditions for determining the second value.

At 425, the UE 115-d may obtain (e.g., from the GNSS component) second location information associated with the UE 115-d. The second location information may be different from the first location information.

At 430, the UE 115-d may determine a time difference associated with one or more previous communications at the UE 115-d and a transmission timing of the second message. In some examples, the time difference may be based on a first duration between a first previous communication and a transmission timing of the second message, a second duration between a second previous communication and the transmission timing of the second message, or both. For example, the time difference may be the lower of the first duration and the second duration. In some examples, the UE 115-d may determine that the time difference satisfies a threshold, where the time difference satisfying the threshold may satisfy one of the conditions for determining the second value. In some examples, the UE 115-d may determine, that a location change of the UE 115-d satisfies one or more thresholds, where the location change may be based on the first location information and the second location information. The location change satisfying one or more thresholds may satisfy one of the conditions for determining the second value. In some examples, the UE 115-d may determine that a change associated with the TA component satisfies one or more thresholds, where the change satisfying one or more thresholds may satisfy one of the conditions for determining the second value.

At 435, the UE 115-d may transmit the second message according to the second value for the TA component, where the second value may be based on the second location information and the time difference. In some examples, the second value may be based on an autonomous adjustment step, an aggregate adjustment rate, a scaling factor, or any combination thereof. In some examples, the UE 115-d may transmit the second message via a RACH, for example, based on the time difference satisfying a threshold. By implementing one or more of the described techniques for timing adjustment, the UE 115-d may be able to transmit the second message more efficiently, or in a manner that increases data throughput, or considers power consumption or processing load, among other considerations.

Figure 5:
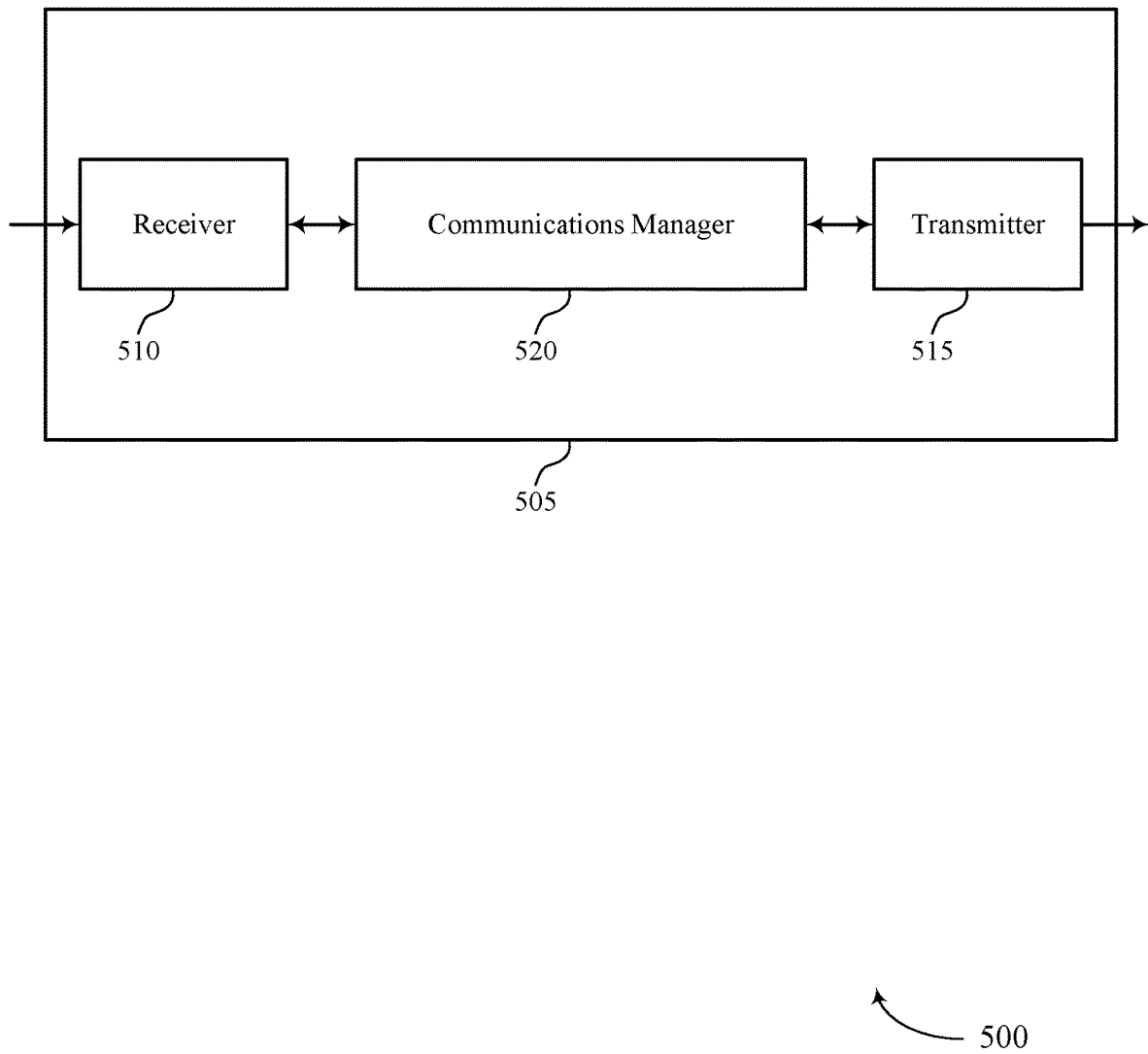
FIGS. 5 and 6 show block diagrams of devices that support techniques for timing adjustment in accordance with one or more aspects of the present disclosure.

FIG. 5 shows a block diagram 500 of a device 505 that supports techniques for timing adjustment in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for timing adjustment). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for timing adjustment). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for timing adjustment as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for transmitting a first message according to a first value for a timing advance component, the first value based on first location information associated with the UE. The communications manager 520 may be configured as or otherwise support a means for obtaining second location information associated with the UE, the second location information different from the first location information. The communications manager 520 may be configured as or otherwise support a means for transmitting a second message according to a second value for the timing advance component, the second value different from the first value, the second value based on the second location information and a time difference associated with at least one previous communication at the UE.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing, reduced power consumption, or more efficient utilization of communication resources.

Figure 6:
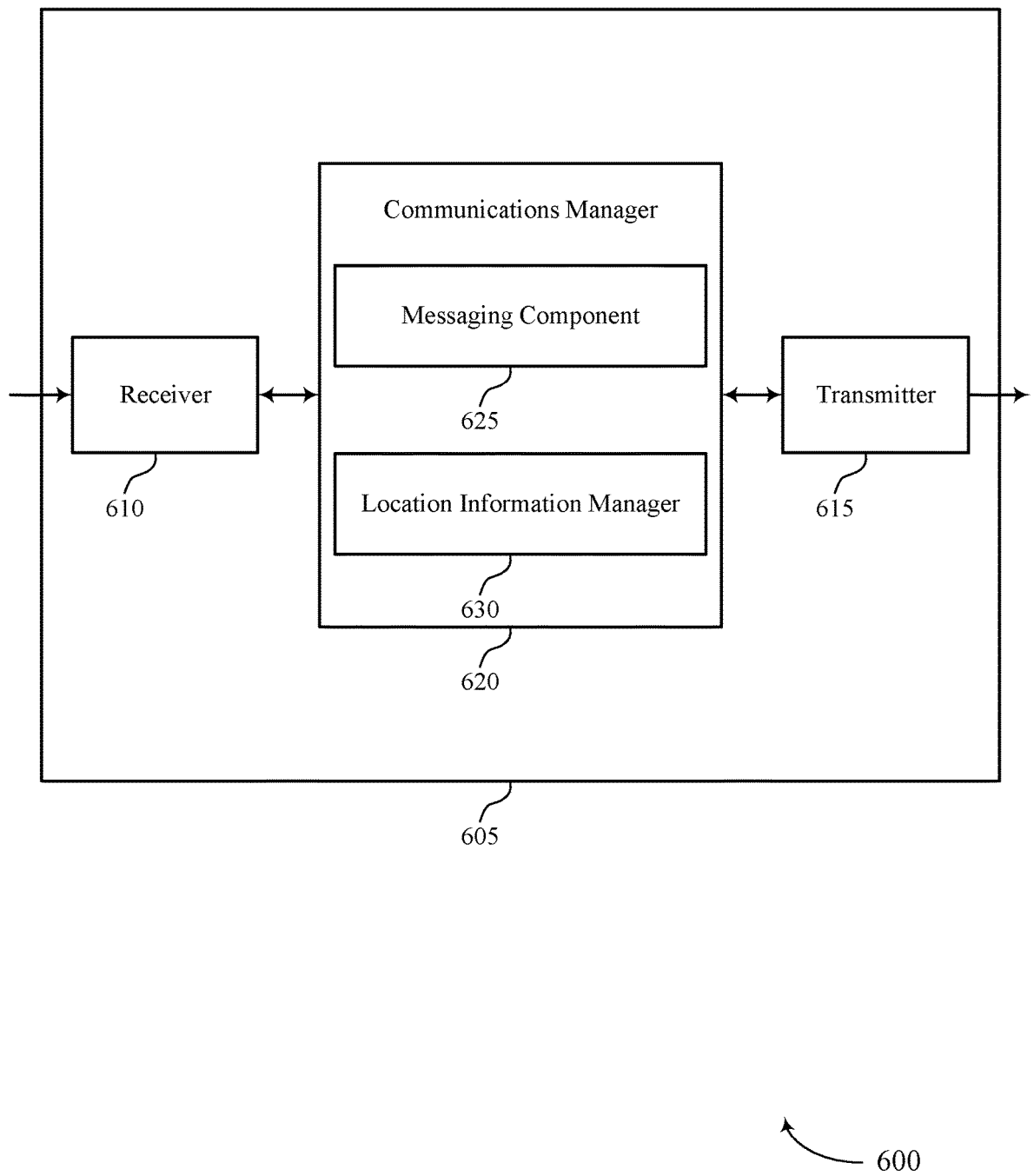

FIG. 6 shows a block diagram 600 of a device 605 that supports techniques for timing adjustment in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for timing adjustment). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for timing adjustment). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for timing adjustment as described herein. For example, the communications manager 620 may include a messaging component 625 a location information manager 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The messaging component 625 may be configured as or otherwise support a means for transmitting a first message according to a first value for a timing advance component, the first value based on first location information associated with the UE. The location information manager 630 may be configured as or otherwise support a means for obtaining second location information associated with the UE, the second location information different from the first location information. The messaging component 625 may be configured as or otherwise support a means for transmitting a second message according to a second value for the timing advance component, the second value different from the first value, the second value based on the second location information and a time difference associated with at least one previous communication at the UE.

Figure 7:
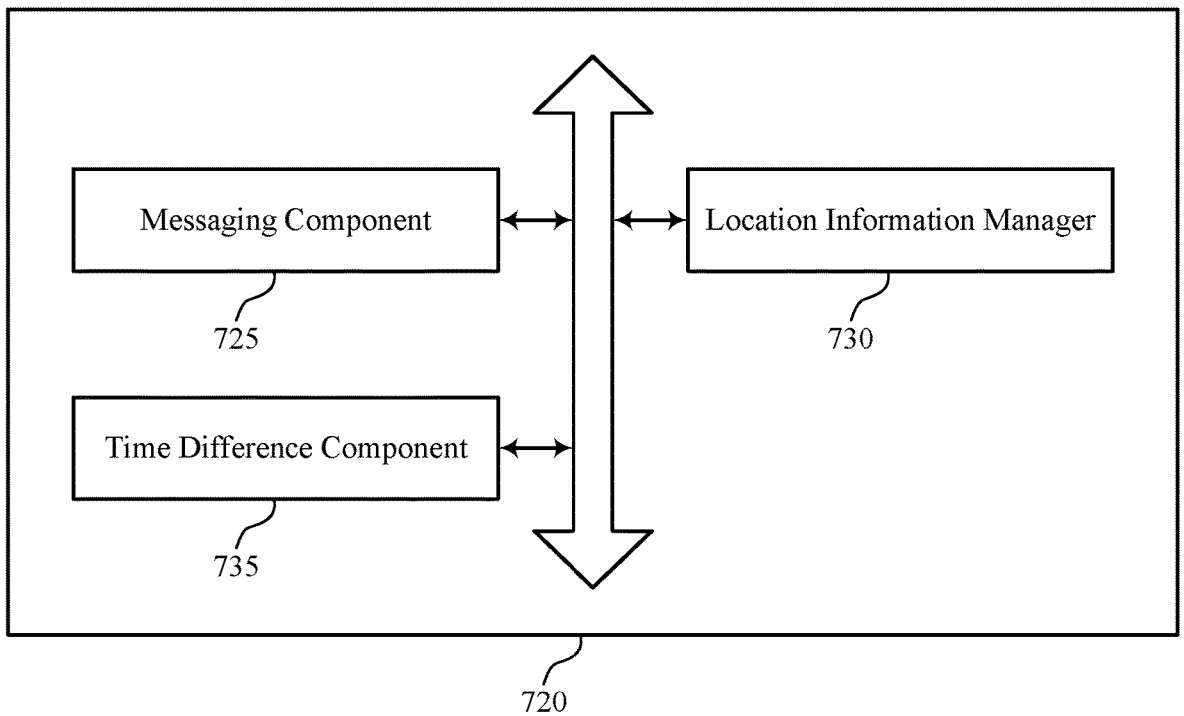
FIG. 7 shows a block diagram of a communications manager that supports techniques for timing adjustment in accordance with one or more aspects of the present disclosure.

FIG. 7 shows a block diagram 700 of a communications manager 720 that supports techniques for timing adjustment in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for timing adjustment as described herein. For example, the communications manager 720 may include a messaging component 725, a location information manager 730, a time difference component 735, or any combination thereof. Each of these components may communicate, directly or indirectly, with one another (e.g., via one or more buses).

The communications manager 720 may support wireless communication at a UE in accordance with examples as disclosed herein. The messaging component 725 may be configured as or otherwise support a means for transmitting a first message according to a first value for a timing advance component, the first value based on first location information associated with the UE. The location information manager 730 may be configured as or otherwise support a means for obtaining second location information associated with the UE, the second location information different from the first location information. In some examples, the messaging component 725 may be configured as or otherwise support a means for transmitting a second message according to a second value for the timing advance component, the second value different from the first value, the second value based on the second location information and a time difference associated with at least one previous communication at the UE.

In some examples, to support transmitting the second message, the messaging component 725 may be configured as or otherwise support a means for transmitting the second message based on the time difference, where the time difference is based on a first duration between a first previous communication of the at least one previous communication and a transmission timing of the second message, a second duration between a second previous communication of the at least one previous communication and the transmission timing of the second message, or both.

In some examples, the time difference is a lower duration of the first duration and the second duration.

In some examples, the first previous communication includes the first message and the second previous communication includes a previous timing advance command, and the messaging component 725 may be configured as or otherwise support a means for receiving the previous timing advance command from a network entity.

In some examples, to support transmitting the second message, the messaging component 725 may be configured as or otherwise support a means for transmitting the second message according to the second value, where the second value is based on an autonomous adjustment step, an aggregate adjustment rate, a scaling factor, or any combination thereof.

In some examples, the messaging component 725 may be configured as or otherwise support a means for receiving, from a network entity, a timing scheme that indicates one or more conditions for the UE to use the second value, where the second message is transmitted according to the second value based on the timing scheme and satisfaction of at least one of the one or more conditions.

In some examples, the time difference component 735 may be configured as or otherwise support a means for determining that the time difference satisfies a threshold, where the satisfaction of the at least one of the one or more conditions includes the time difference satisfying the threshold.

In some examples, the location information manager 730 may be configured as or otherwise support a means for determining, based on the second location information, that a location change of the UE satisfies one or more thresholds, the location change based on the first location information and the second location information, where the satisfaction of the at least one of the one or more conditions includes the location change of the UE satisfying the one or more thresholds.

In some examples, the location information manager 730 may be configured as or otherwise support a means for determining, based on the second location information, that a change associated with the timing advance component satisfies one or more thresholds, where the satisfaction of the at least one of the one or more conditions includes the change associated with the timing advance component satisfying the one or more thresholds.

In some examples, the messaging component 725 may be configured as or otherwise support a means for receiving, from the network entity, an indication that the UE is to determine the second value, where the satisfaction of the at least one of the one or more conditions includes the UE receiving the indication.

In some examples, to support transmitting the second message, the messaging component 725 may be configured as or otherwise support a means for transmitting the second message via a random access channel based on the time difference satisfying a threshold.

In some examples, to support transmitting the second message, the messaging component 725 may be configured as or otherwise support a means for transmitting the second message to a network entity that supports non-terrestrial network communications for the UE.

Figure 8:
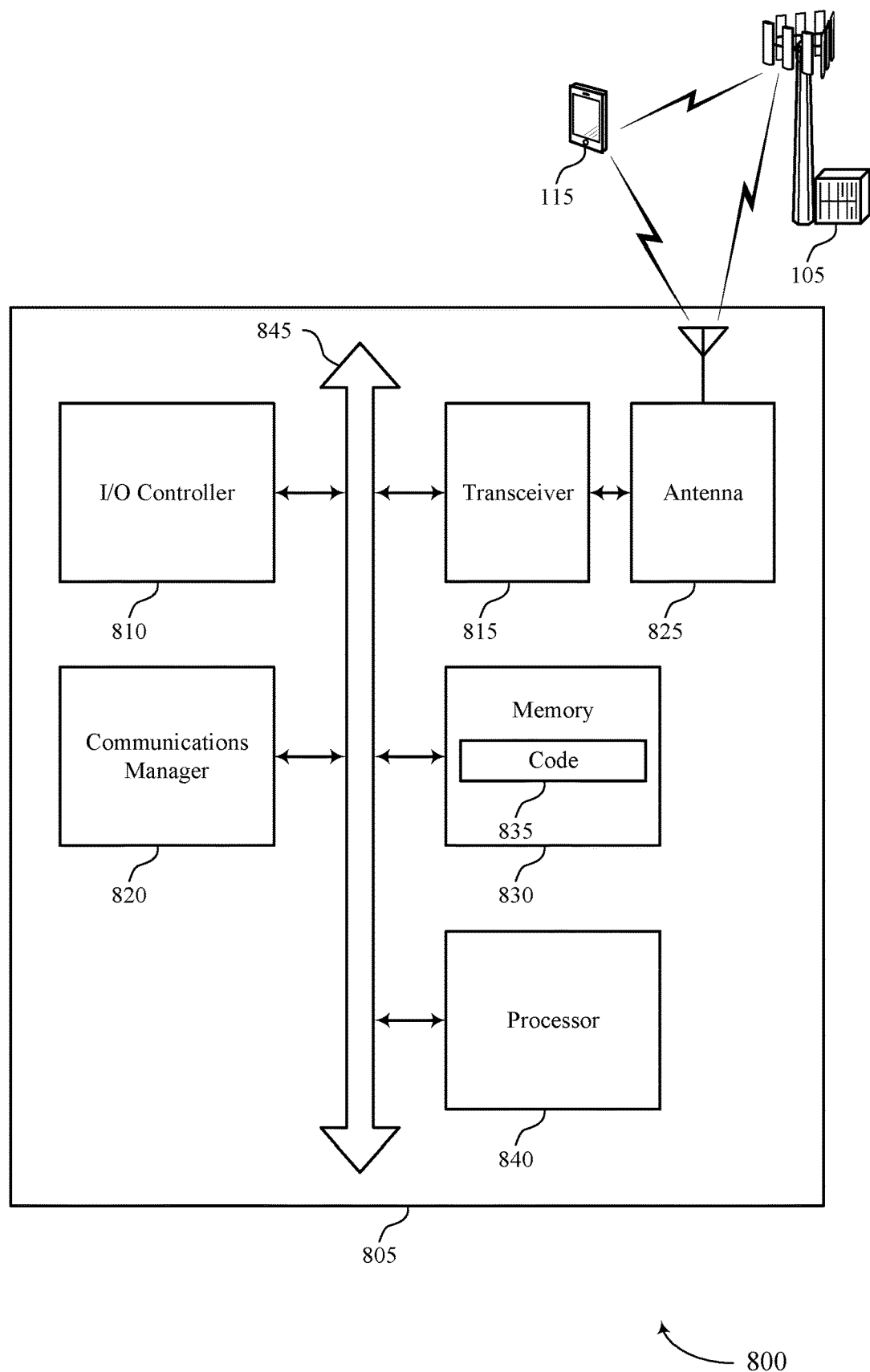
FIG. 8 shows a diagram of a system including a device that supports techniques for timing adjustment in accordance with one or more aspects of the present disclosure.

FIG. 8 shows a diagram of a system 800 including a device 805 that supports techniques for timing adjustment in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for timing adjustment). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for transmitting a first message according to a first value for a timing advance component, the first value based on first location information associated with the UE. The communications manager 820 may be configured as or otherwise support a means for obtaining second location information associated with the UE, the second location information different from the first location information. The communications manager 820 may be configured as or otherwise support a means for transmitting a second message according to a second value for the timing advance component, the second value different from the first value, the second value based on the second location information and a time difference associated with at least one previous communication at the UE.

By including or configuring the communications manager 820 in accordance with examples as described herein, the device 805 may support techniques for improved communication reliability, reduced latency, improved user experience related to reduced processing, reduced power consumption, more efficient utilization of communication resources, or improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for timing adjustment as described herein, or the processor 840 and the memory 830 may be otherwise configured to perform or support such operations.

Figure 9:
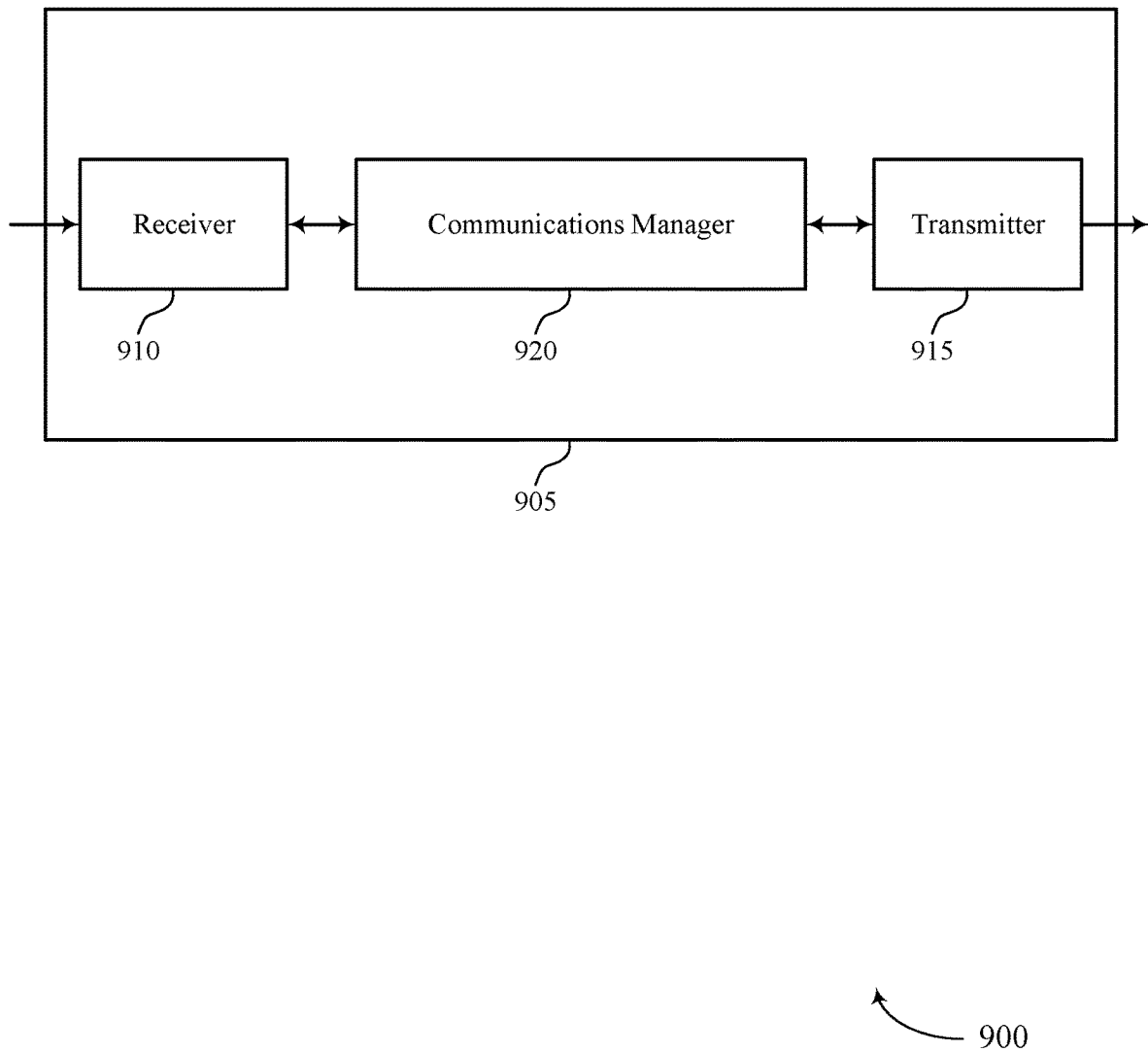
FIGS. 9 and 10 show block diagrams of devices that support techniques for timing adjustment in accordance with one or more aspects of the present disclosure.

FIG. 9 shows a block diagram 900 of a device 905 that supports techniques for timing adjustment in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of techniques for timing adjustment as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for obtaining a first message according to a first value for a timing advance component, the first value based on first location information associated with a UE. The communications manager 920 may be configured as or otherwise support a means for outputting a timing scheme that indicates one or more conditions for the UE to use a second value for the timing advance component, the second value different from the first value. The communications manager 920 may be configured as or otherwise support a means for obtaining a second message according to the second value for the timing advance component, the second value based on the timing scheme and satisfaction of at least one of the one or more conditions.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, reduced power consumption, or more efficient utilization of communication resources.

Figure 10:
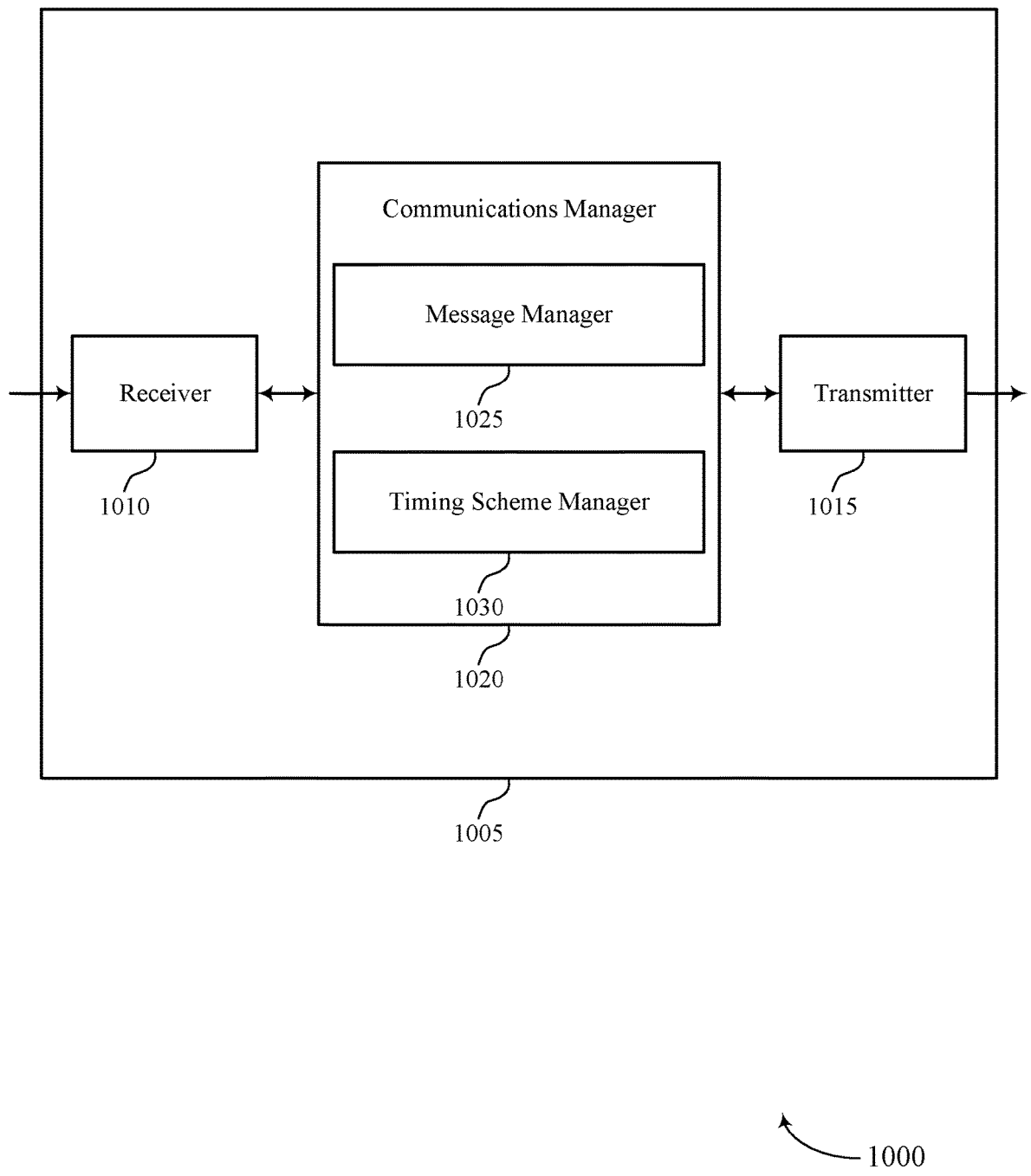

FIG. 10 shows a block diagram 1000 of a device 1005 that supports techniques for timing adjustment in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of techniques for timing adjustment as described herein. For example, the communications manager 1020 may include a message manager 1025 a timing scheme manager 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The message manager 1025 may be configured as or otherwise support a means for obtaining a first message according to a first value for a timing advance component, the first value based on first location information associated with a UE. The timing scheme manager 1030 may be configured as or otherwise support a means for outputting a timing scheme that indicates one or more conditions for the UE to use a second value for the timing advance component, the second value different from the first value. The message manager 1025 may be configured as or otherwise support a means for obtaining a second message according to the second value for the timing advance component, the second value based on the timing scheme and satisfaction of at least one of the one or more conditions.

Figure 11:
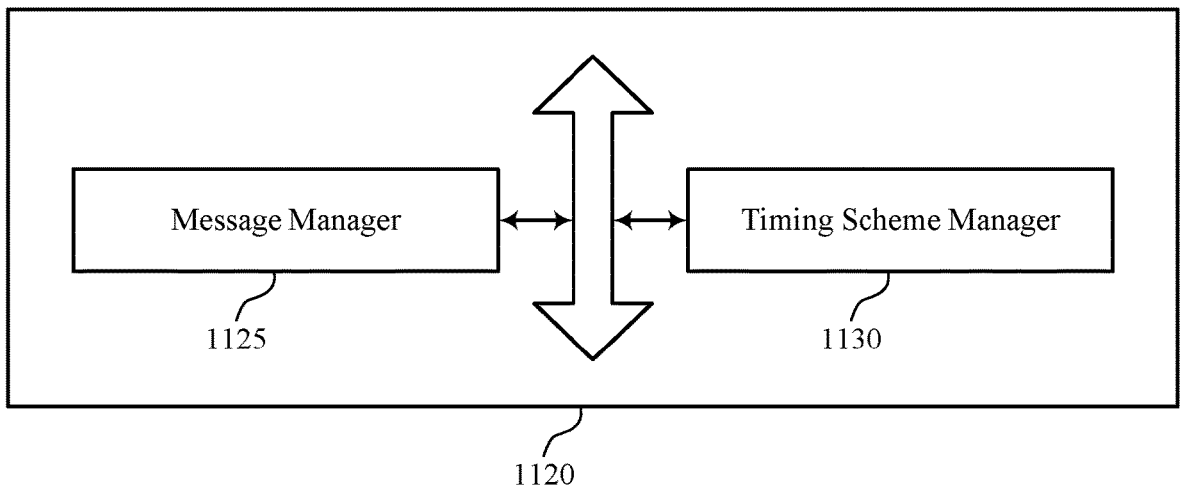
FIG. 11 shows a block diagram of a communications manager that supports techniques for timing adjustment in accordance with one or more aspects of the present disclosure.

FIG. 11 shows a block diagram 1100 of a communications manager 1120 that supports techniques for timing adjustment in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for timing adjustment as described herein. For example, the communications manager 1120 may include a message manager 1125 a timing scheme manager 1130, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The message manager 1125 may be configured as or otherwise support a means for obtaining a first message according to a first value for a timing advance component, the first value based on first location information associated with a UE. The timing scheme manager 1130 may be configured as or otherwise support a means for outputting a timing scheme that indicates one or more conditions for the UE to use a second value for the timing advance component, the second value different from the first value. In some examples, the message manager 1125 may be configured as or otherwise support a means for obtaining a second message according to the second value for the timing advance component, the second value based on the timing scheme and satisfaction of at least one of the one or more conditions.

In some examples, the message manager 1125 may be configured as or otherwise support a means for outputting an indication that the UE is to determine the second value, where the satisfaction of the at least one of the one or more conditions includes outputting the indication.

In some examples, to support obtaining the second message, the message manager 1125 may be configured as or otherwise support a means for obtaining the second message via a random access channel.

In some examples, the network entity supports non-terrestrial network communications for the UE.

Figure 12:
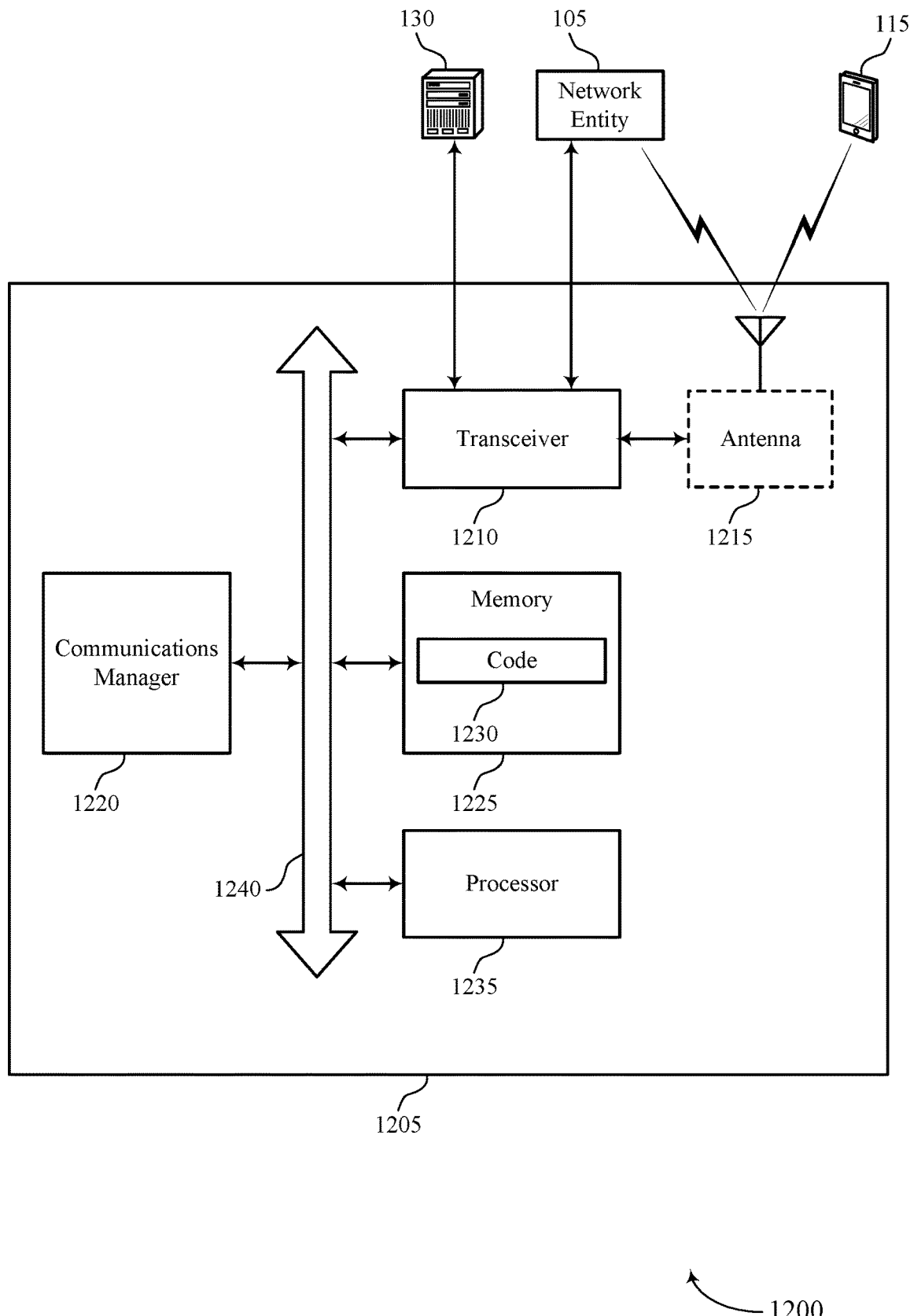
FIG. 12 shows a diagram of a system including a device that supports techniques for timing adjustment in accordance with one or more aspects of the present disclosure.

FIG. 12 shows a diagram of a system 1200 including a device 1205 that supports techniques for timing adjustment in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting techniques for timing adjustment). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for obtaining a first message according to a first value for a timing advance component, the first value based on first location information associated with a UE. The communications manager 1220 may be configured as or otherwise support a means for outputting a timing scheme that indicates one or more conditions for the UE to use a second value for the timing advance component, the second value different from the first value. The communications manager 1220 may be configured as or otherwise support a means for obtaining a second message according to the second value for the timing advance component, the second value based on the timing scheme and satisfaction of at least one of the one or more conditions.

By including or configuring the communications manager 1220 in accordance with examples as described herein, the device 1205 may support techniques for improved communication reliability, reduced latency, reduced power consumption, more efficient utilization of communication resources, or improved coordination between devices.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of techniques for timing adjustment as described herein, or the processor 1235 and the memory 1225 may be otherwise configured to perform or support such operations.

Figure 13:
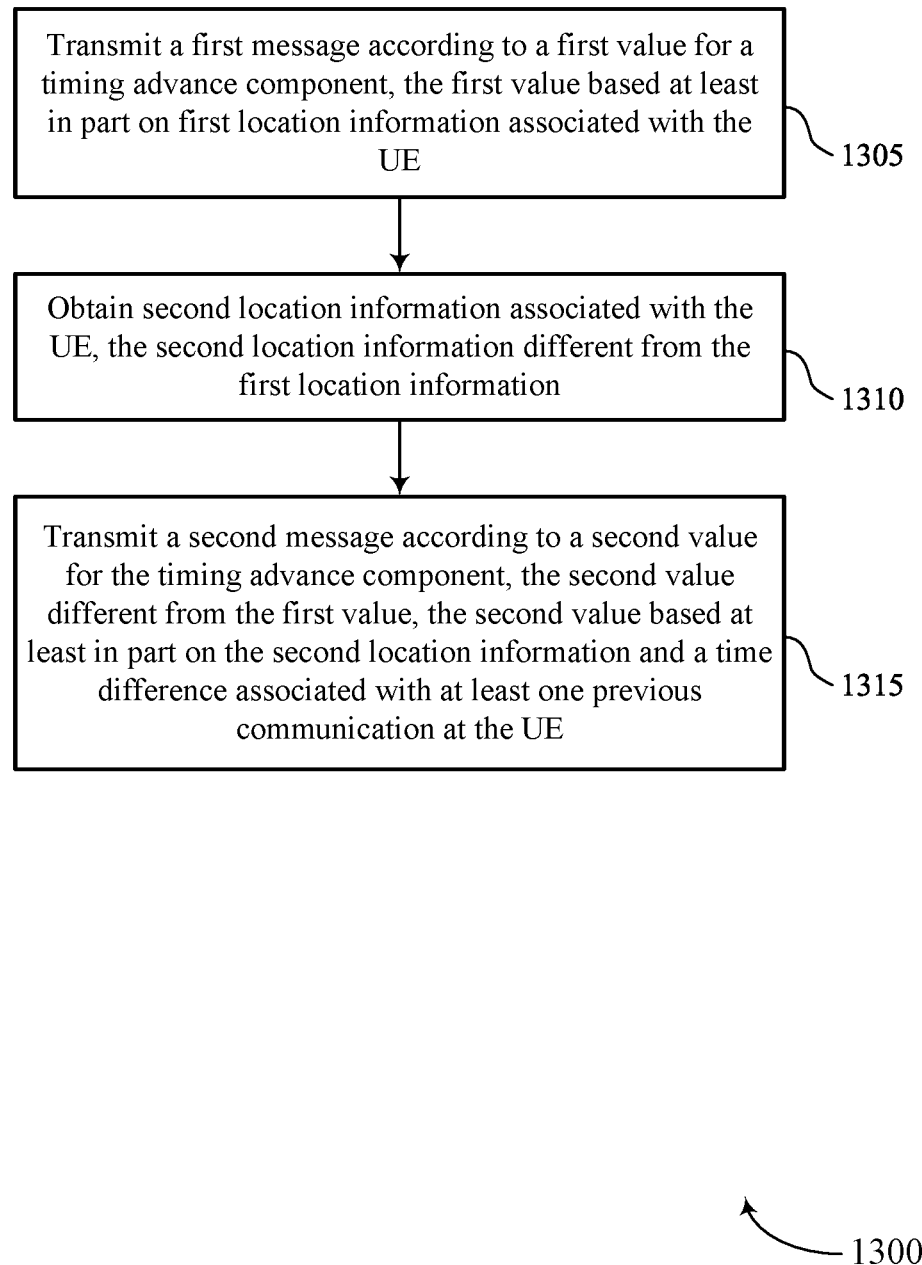
FIGS. 13 through 15 show flowcharts illustrating methods that support techniques for timing adjustment in accordance with one or more aspects of the present disclosure.

FIG. 13 shows a flowchart illustrating a method 1300 that supports techniques for timing adjustment in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting a first message according to a first value for a timing advance component, the first value based on first location information associated with the UE. The operations of 1305 may be performed in accordance with examples as disclosed herein. In some examples, aspects of the operations of 1305 may be performed by a messaging component 725 as described with reference to FIG. 7.

At 1310, the method may include obtaining second location information associated with the UE, the second location information different from the first location information. The operations of 1310 may be performed in accordance with examples as disclosed herein. In some examples, aspects of the operations of 1310 may be performed by a location information manager 730 as described with reference to FIG. 7.

At 1315, the method may include transmitting a second message according to a second value for the timing advance component, the second value different from the first value, the second value based on the second location information and a time difference associated with at least one previous communication at the UE. The operations of 1315 may be performed in accordance with examples as disclosed herein. In some examples, aspects of the operations of 1315 may be performed by a messaging component 725 as described with reference to FIG. 7.

Figure 14:
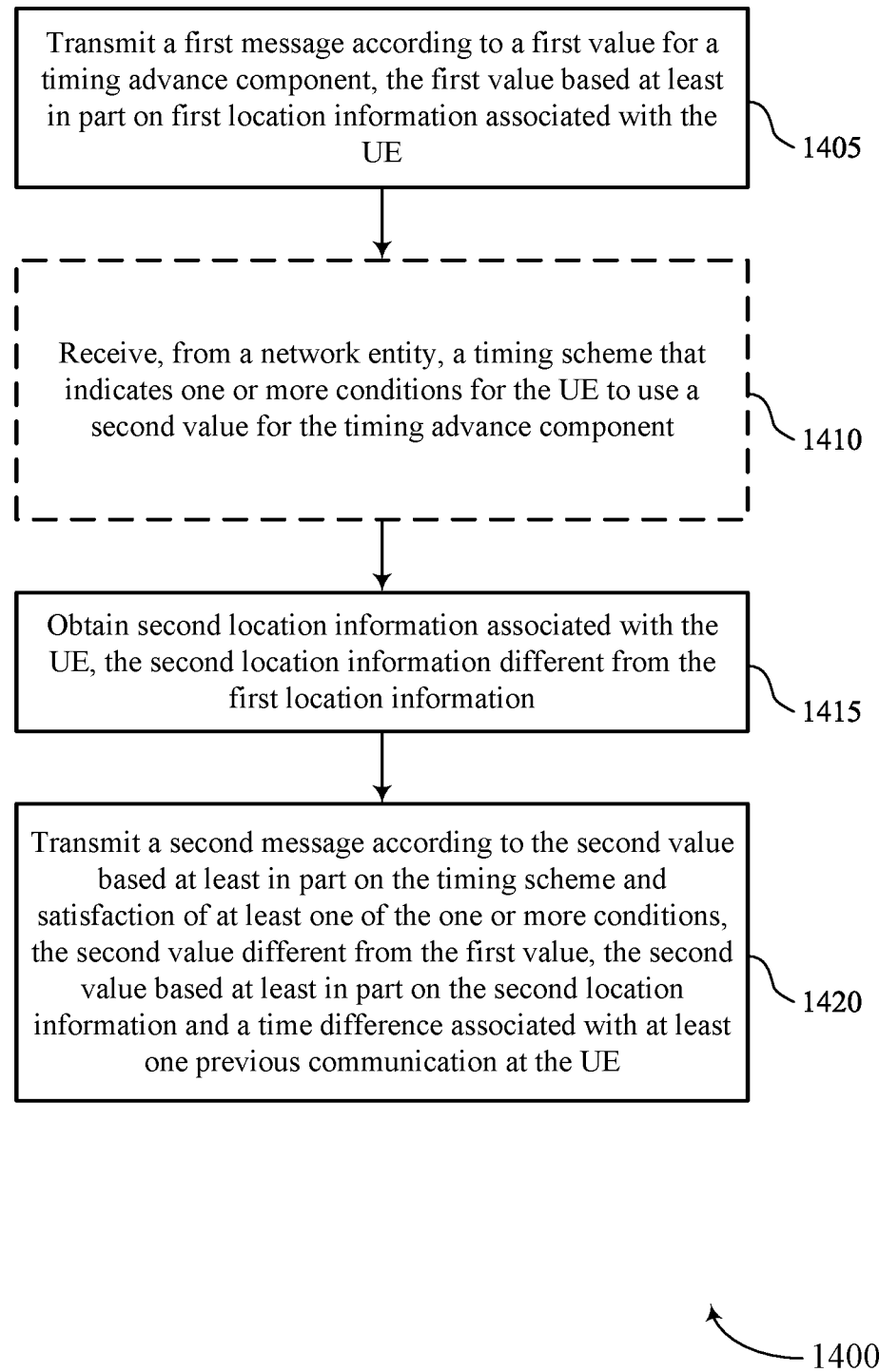

FIG. 14 shows a flowchart illustrating a method 1400 that supports techniques for timing adjustment in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting a first message according to a first value for a timing advance component, the first value based on first location information associated with the UE. The operations of 1405 may be performed in accordance with examples as disclosed herein. In some examples, aspects of the operations of 1405 may be performed by a messaging component 725 as described with reference to FIG. 7.

At 1410, the method may include receiving, from a network entity, a timing scheme that indicates one or more conditions for the UE to use a second value for the timing advance component. The operations of 1410 may be performed in accordance with examples as disclosed herein. In some examples, aspects of the operations of 1410 may be performed by a messaging component 725 as described with reference to FIG. 7.

At 1415, the method may include obtaining second location information associated with the UE, the second location information different from the first location information. The operations of 1415 may be performed in accordance with examples as disclosed herein. In some examples, aspects of the operations of 1415 may be performed by a location information manager 730 as described with reference to FIG. 7.

At 1420, the method may include transmitting a second message according to the second value based on the timing scheme and satisfaction of at least one of the one or more conditions, the second value different from the first value, the second value based on the second location information and a time difference associated with at least one previous communication at the UE. The operations of 1420 may be performed in accordance with examples as disclosed herein. In some examples, aspects of the operations of 1420 may be performed by a messaging component 725 as described with reference to FIG. 7.

Figure 15:
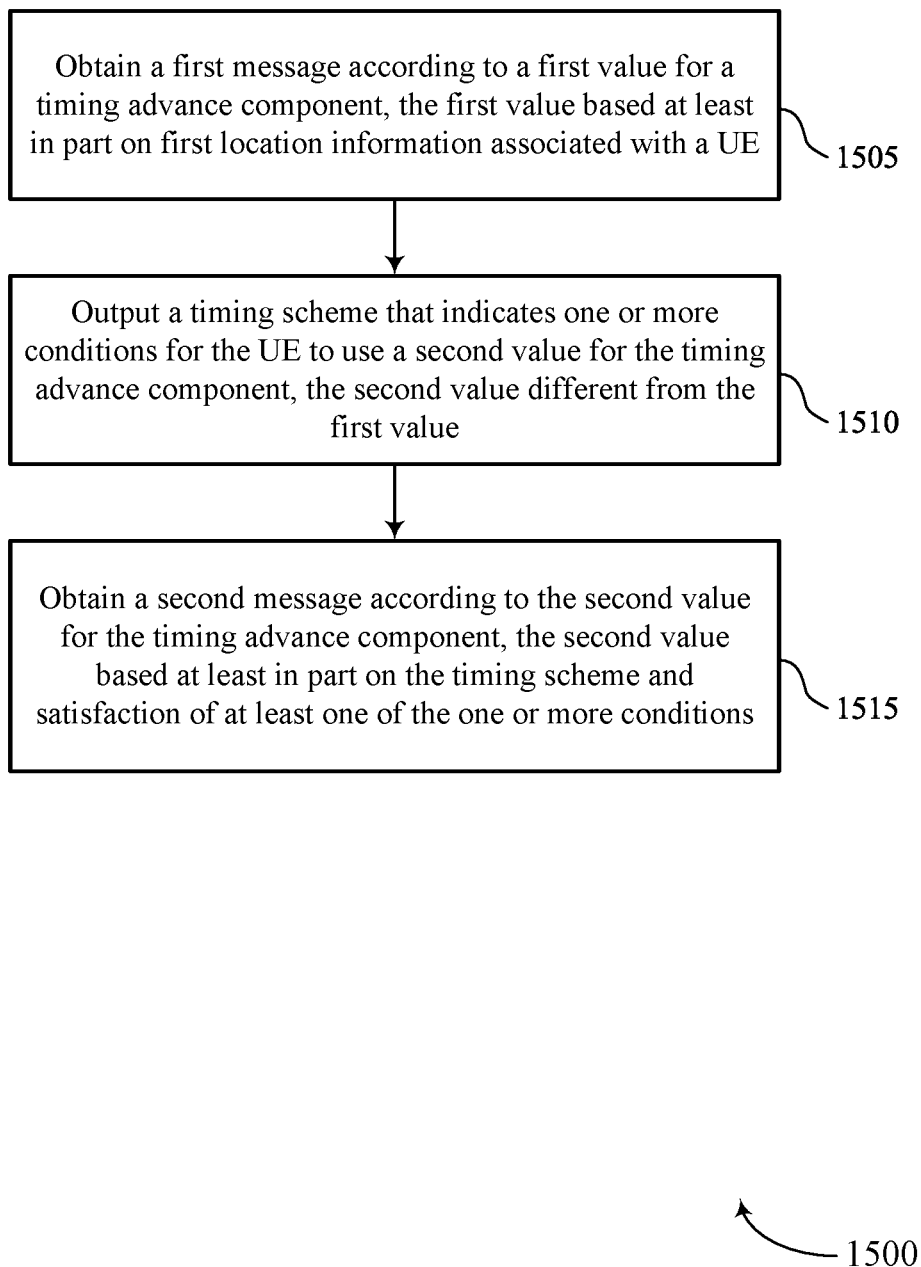

FIG. 15 shows a flowchart illustrating a method 1500 that supports techniques for timing adjustment in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include obtaining a first message according to a first value for a timing advance component, the first value based on first location information associated with a UE. The operations of 1505 may be performed in accordance with examples as disclosed herein. In some examples, aspects of the operations of 1505 may be performed by a message manager 1125 as described with reference to FIG. 11.

At 1510, the method may include outputting a timing scheme that indicates one or more conditions for the UE to use a second value for the timing advance component, the second value different from the first value. The operations of 1510 may be performed in accordance with examples as disclosed herein. In some examples, aspects of the operations of 1510 may be performed by a timing scheme manager 1130 as described with reference to FIG. 11.

At 1515, the method may include obtaining a second message according to the second value for the timing advance component, the second value based on the timing scheme and satisfaction of at least one of the one or more conditions. The operations of 1515 may be performed in accordance with examples as disclosed herein. In some examples, aspects of the operations of 1515 may be performed by a message manager 1125 as described with reference to FIG. 11.

The following provides an overview of aspects of the present disclosure:

Aspect 1: A method for wireless communication at a UE, comprising: transmitting a first message according to a first value for a timing advance component, the first value based at least in part on first location information associated with the UE; obtaining second location information associated with the UE, the second location information different from the first location information; and transmitting a second message according to a second value for the timing advance component, the second value different from the first value, the second value based at least in part on the second location information and a time difference associated with at least one previous communication at the UE.

Aspect 2: The method of aspect 1, wherein transmitting the second message comprises: transmitting the second message based at least in part on the time difference, wherein the time difference is based at least in part on a first duration between a first previous communication of the at least one previous communication and a transmission timing of the second message, a second duration between a second previous communication of the at least one previous communication and the transmission timing of the second message, or both.

Aspect 3: The method of aspect 2, wherein the time difference is a lower duration of the first duration and the second duration.

Aspect 4: The method of any of aspects 2 through 3, wherein the first previous communication comprises the first message and the second previous communication comprises a previous timing advance command, the method further comprising: receiving the previous timing advance command from a network entity.

Aspect 5: The method of any of aspects 1 through 4, wherein transmitting the second message comprises: transmitting the second message according to the second value, wherein the second value is based at least in part on an autonomous adjustment step, an aggregate adjustment rate, a scaling factor, or any combination thereof Aspect 6: The method of any of aspects 1 through 5, further comprising: receiving, from a network entity, a timing scheme that indicates one or more conditions for the UE to use the second value, wherein the second message is transmitted according to the second value based at least in part on the timing scheme and satisfaction of at least one of the one or more conditions.

Aspect 7: The method of aspect 6, further comprising: determining that the time difference satisfies a threshold, wherein the satisfaction of the at least one of the one or more conditions comprises the time difference satisfying the threshold.

Aspect 8: The method of any of aspects 6 through 7, further comprising: determining, based at least in part on the second location information, that a location change of the UE satisfies one or more thresholds, the location change based at least in part on the first location information and the second location information, wherein the satisfaction of the at least one of the one or more conditions comprises the location change of the UE satisfying the one or more thresholds.

Aspect 9: The method of any of aspects 6 through 8, further comprising: determining, based at least in part on the second location information, that a change associated with the timing advance component satisfies one or more thresholds, wherein the satisfaction of the at least one of the one or more conditions comprises the change associated with the timing advance component satisfying the one or more thresholds.

Aspect 10: The method of any of aspects 6 through 9, further comprising: receiving, from the network entity, an indication that the UE is to determine the second value, wherein the satisfaction of the at least one of the one or more conditions comprises the UE receiving the indication.

Aspect 11: The method of any of aspects 1 through 10, wherein transmitting the second message comprises: transmitting the second message via a random access channel based at least in part on the time difference satisfying a threshold.

Aspect 12: The method of any of aspects 1 through 11, wherein transmitting the second message comprises: transmitting the second message to a network entity that supports non-terrestrial network communications for the UE.

Aspect 13: A method for wireless communications at a network entity, comprising: obtaining a first message according to a first value for a timing advance component, the first value based at least in part on first location information associated with a UE; outputting a timing scheme that indicates one or more conditions for the UE to use a second value for the timing advance component, the second value different from the first value; and obtaining a second message according to the second value for the timing advance component, the second value different from the first value, the second value based at least in part on the timing scheme and satisfaction of at least one of the one or more conditions.

Aspect 14: The method of aspect 13, further comprising: outputting an indication that the UE is to determine the second value, wherein the satisfaction of the at least one of the one or more conditions comprises outputting the indication.

Aspect 15: The method of any of aspects 13 through 14, wherein obtaining the second message comprises: obtaining the second message via a random access channel.

Aspect 16: The method of any of aspects 13 through 15, wherein the network entity supports non-terrestrial network communications for the UE.

Aspect 17: An apparatus for wireless communication at a UE, comprising a processor and memory coupled with the processor, the processor configured to perform a method of any of aspects 1 through 12.

Aspect 18: An apparatus for wireless communication at a UE, comprising at least one means for performing a method of any of aspects 1 through 12.

Aspect 19: A non-transitory computer-readable medium storing code for wireless communication at a UE, the code comprising instructions executable by a processor to perform a method of any of aspects 1 through 12.

Aspect 20: An apparatus for wireless communications at a network entity, comprising a processor and memory coupled with the processor, the processor configured to perform a method of any of aspects 13 through 16.

Aspect 21: An apparatus for wireless communications at a network entity, comprising at least one means for performing a method of any of aspects 13 through 16.

Aspect 22: A non-transitory computer-readable medium storing code for wireless communications at a network entity, the code comprising instructions executable by a processor to perform a method of any of aspects 13 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
  one or more memories; and
  one or more processors coupled with the one or more memories and configured to cause the UE to:
    transmit a first message according to a first value for a timing advance component, the first value based at least in part on first location information associated with the UE;
    obtain second location information associated with the UE, the second location information different from the first location information; and
    transmit a second message according to a second value for the timing advance component, the second value different from the first value, the second value based at least in part on the second location information and a time difference associated with at least one previous communication at the UE.

2. The apparatus of claim 1, wherein, to transmit the second message, the one or more processors are configured to cause the UE to:
transmit the second message based at least in part on the time difference, wherein the time difference is based at least in part on a first duration between a first previous communication of the at least one previous communication and a transmission timing of the second message, a second duration between a second previous communication of the at least one previous communication and the transmission timing of the second message, or both.

3. The apparatus of claim 2, wherein the time difference is a lower duration of the first duration and the second duration.

4. The apparatus of claim 2, wherein the first previous communication comprises the first message and the second previous communication comprises a previous timing advance command, and the one or more processors are further configured to cause the UE to:
receive the previous timing advance command from a network entity.

5. The apparatus of claim 1, wherein, to transmit the second message, the one or more processors are configured to cause the UE to:
transmit the second message according to the second value, wherein the second value is based at least in part on an autonomous adjustment step, an aggregate adjustment rate, a scaling factor, or any combination thereof.

6. The apparatus of claim 1, the one or more processors further configured to cause the UE to:
receive, from a network entity, a timing scheme that indicates one or more conditions for the UE to use the second value, wherein the second message is transmitted according to the second value based at least in part on the timing scheme and satisfaction of at least one of the one or more conditions.

7. The apparatus of claim 6, the one or more processors further configured to cause the UE to:
determine that the time difference satisfies a threshold, wherein the satisfaction of the at least one of the one or more conditions comprises the time difference satisfying the threshold.

8. The apparatus of claim 6, the one or more processors further configured to cause the UE to:
determine, based at least in part on the second location information, that a location change of the UE satisfies one or more thresholds, the location change based at least in part on the first location information and the second location information, wherein the satisfaction of the at least one of the one or more conditions comprises the location change of the UE satisfying the one or more thresholds.

9. The apparatus of claim 6, the one or more processors further configured to cause the UE to:
determine, based at least in part on the second location information, that a change associated with the timing advance component satisfies one or more thresholds, wherein the satisfaction of the at least one of the one or more conditions comprises the change associated with the timing advance component satisfying the one or more thresholds.

10. The apparatus of claim 6, the one or more processors further configured to cause the UE to:
receive, from the network entity, an indication that the UE is to determine the second value, wherein the satisfaction of the at least one of the one or more conditions comprises the UE receiving the indication.

11. The apparatus of claim 1, wherein, to transmit the second message, the one or more processors are configured to cause the UE to:
transmit the second message via a random access channel based at least in part on the time difference satisfying a threshold.

12. The apparatus of claim 1, wherein, to transmit the second message, the one or more processors are configured to cause the UE to:
transmit the second message to a network entity that supports non-terrestrial network communications for the UE.

13. The apparatus of claim 1, further comprising:
an antenna array operable to transmit the first message or the second message.

14. An apparatus for wireless communications at a network entity, comprising:
one or more memories; and
one or more processors coupled with the one or more memories and configured to cause the network entity to:
obtain a first message according to a first value for a timing advance component, the first value based at least in part on first location information associated with a user equipment (UE);
output a timing scheme that indicates one or more conditions for the UE to use a second value for the timing advance component; and
obtain a second message according to the second value for the timing advance component, the second value based at least in part on the timing scheme and satisfaction of at least one of the one or more conditions.

15. The apparatus of claim 14, the one or more processors further configured to cause the network entity to:
output an indication that the UE is to determine the second value, wherein the satisfaction of the at least one of the one or more conditions comprises outputting the indication.

16. The apparatus of claim 14, wherein, to obtain the second message, the one or more processors are configured to cause the network entity to:
obtain the second message via a random access channel.

17. The apparatus of claim 14, wherein the network entity supports non-terrestrial network communications for the UE.

18. The apparatus of claim 14, further comprising:
an antenna array operable to obtain the first message or the second message, or output the timing scheme, or both.

19. A method for wireless communication at a user equipment (UE), comprising:
transmitting a first message according to a first value for a timing advance component, the first value based at least in part on first location information associated with the UE;
obtaining second location information associated with the UE, the second location information different from the first location information; and
transmitting a second message according to a second value for the timing advance component, the second value different from the first value, the second value based at least in part on the second location information and a time difference associated with at least one previous communication at the UE.

20. The method of claim 19, the transmitting the second message comprising:
transmitting the second message based at least in part on the time difference, wherein the time difference is based at least in part on a first duration between a first previous communication of the at least one previous communication and a transmission timing of the second message, a second duration between a second previous communication of the at least one previous communication and the transmission timing of the second message, or both.

21. The method of claim 20, the time difference being a lower duration of the first duration and the second duration.

22. The method of claim 20, the first previous communication comprising the first message and the second previous communication comprising a previous timing advance command, the method further comprising:
receiving the previous timing advance command from a network entity.

23. A method for wireless communication at a network entity, comprising:
obtaining a first message according to a first value for a timing advance component, the first value based at least in part on first location information associated with a user equipment (UE);
outputting a timing scheme that indicates one or more conditions for the UE to use a second value for the timing advance component; and
obtaining a second message according to the second value for the timing advance component, the second value based at least in part on the timing scheme and satisfaction of at least one of the one or more conditions.

24. The method of claim 23, further comprising:
outputting an indication that the UE is to determine the second value, wherein the satisfaction of the at least one of the one or more conditions comprises outputting the indication.

25. The method of claim 23, the obtaining the second message comprising:
obtaining the second message via a random access channel.

26. A non-transitory computer-readable medium storing code for wireless communication at a user equipment (UE), the code comprising instructions executable by one or more processors to cause the UE to:
transmit a first message according to a first value for a timing advance component, the first value based at least in part on first location information associated with the UE;
obtain second location information associated with the UE, the second location information different from the first location information; and
transmit a second message according to a second value for the timing advance component, the second value different from the first value, the second value based at least in part on the second location information and a time difference associated with at least one previous communication at the UE.

27. A non-transitory computer-readable medium storing code for wireless communication at a network entity, the code comprising instructions executable by one or more processors to cause the network entity to:
obtain a first message according to a first value for a timing advance component, the first value based at least in part on first location information associated with a user equipment (UE);
output a timing scheme that indicates one or more conditions for the UE to use a second value for the timing advance component; and
obtain a second message according to the second value for the timing advance component, the second value based at least in part on the timing scheme and satisfaction of at least one of the one or more conditions.

* * * * *